Dec. 8, 1970    E. KENNARD    3,545,051
SAFETY HOOK
Filed Sept. 11, 1968    2 Sheets-Sheet 1
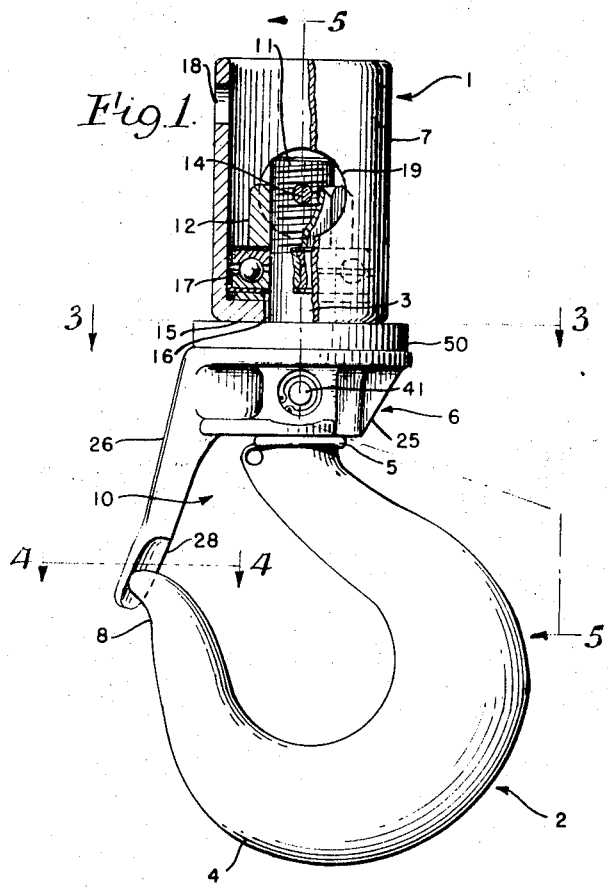
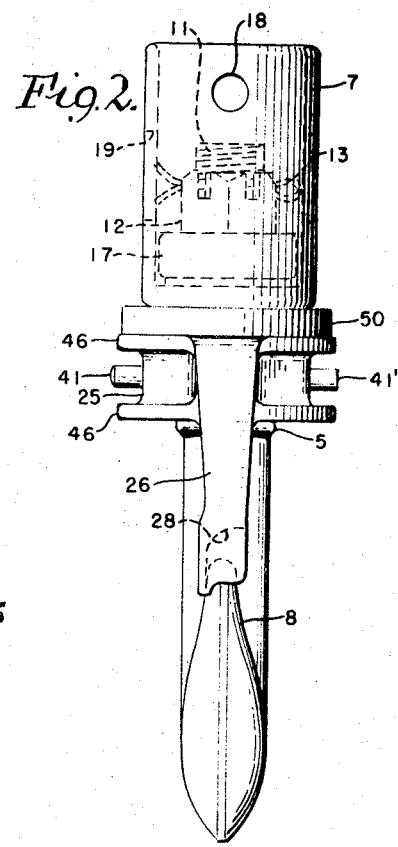
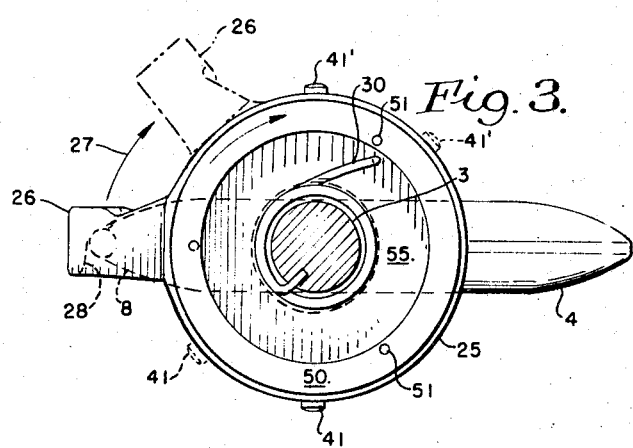
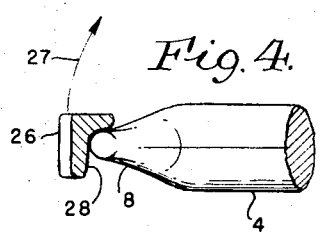
INVENTOR.
EDWARD KENNARD
BY
Bean & Bean
ATTORNEYS Dec. 8, 1970   E. KENNARD   3,545,051
SAFETY HOOK
Filed Sept. 11, 1968   2 Sheets-Sheet 2

INVENTOR.
EDWARD KENNARD
BY
Bean & Bean
ATTORNEYS

United States Patent Office 3,545,051
Patented Dec. 8, 1970

3,545,051
SAFETY HOOK
Edward Kennard, St. Catharines, Ontario, Canada, assignor to Columbus McKinnon Corporation, Tonawanda, N.Y.
Filed Sept. 11, 1968, Ser. No. 758,996
Int. Cl. A44b *13/02*
U.S. Cl. 24—241                               5 Claims

ABSTRACT OF THE DISCLOSURE

A safety hook including a gate rotatably supported for movement between hook mouth closed and open positions; the gate being normally locked in hook mouth closed position by manually releasable retaining pins.

BACKGROUND OF THE INVENTION

Heretofore, numerous devices have been proposed for use to selectively close the mouths of generally J-shaped hooks used in combination with hoists, cranes or the like in order to prevent unintentional removal or separation of a supported object through the mouth of the hook. However, prior devices of which I am aware, possess numerous drawbacks, including interference with normal positioning or withdrawal of supported objects through the mouth of the hook and/or inability to be positively locked in hook mouth closing position.

SUMMARY OF THE INVENTION

The present invention is directed towards a novel safety hook arrangement, wherein a gate is rotatably supported on the shank of the hook for movement between a hook mouth closed position and an open position, whereat the gate is completely removed from adjacent the hook mouth in order to permit unobstructed entrance or withdrawal of a supported object through the mouth when desired. The gate is normally locked in hook mouth closed position by resiliently biased retaining pins adapted to be operably moved to gate releasing position by manually operated push buttons carried on the gate.

The invention envisions the utilization of a torsion spring to automatically return the gate to hook mouth closed position upon the release thereof by an operator.

DESCRIPTION OF THE DRAWINGS

The structure and mode of operation of the safety hook of the present invention will be more fully understood by reference to the following description taken with the accompanying drawings wherein:

FIG. 1 is a side elevational view of the safety hook of the present invention with parts broken away for clarity;

FIG. 2 is an end elevational view of the safety hook illustrated in FIG. 1;

FIG. 3 is a sectional view taken generally along the lines 3—3 in FIG. 1;

FIG. 4 is a sectional view taken generally along the line 4—4 in FIG. 1;

DETAILED DESCRIPTION

Figure 5:
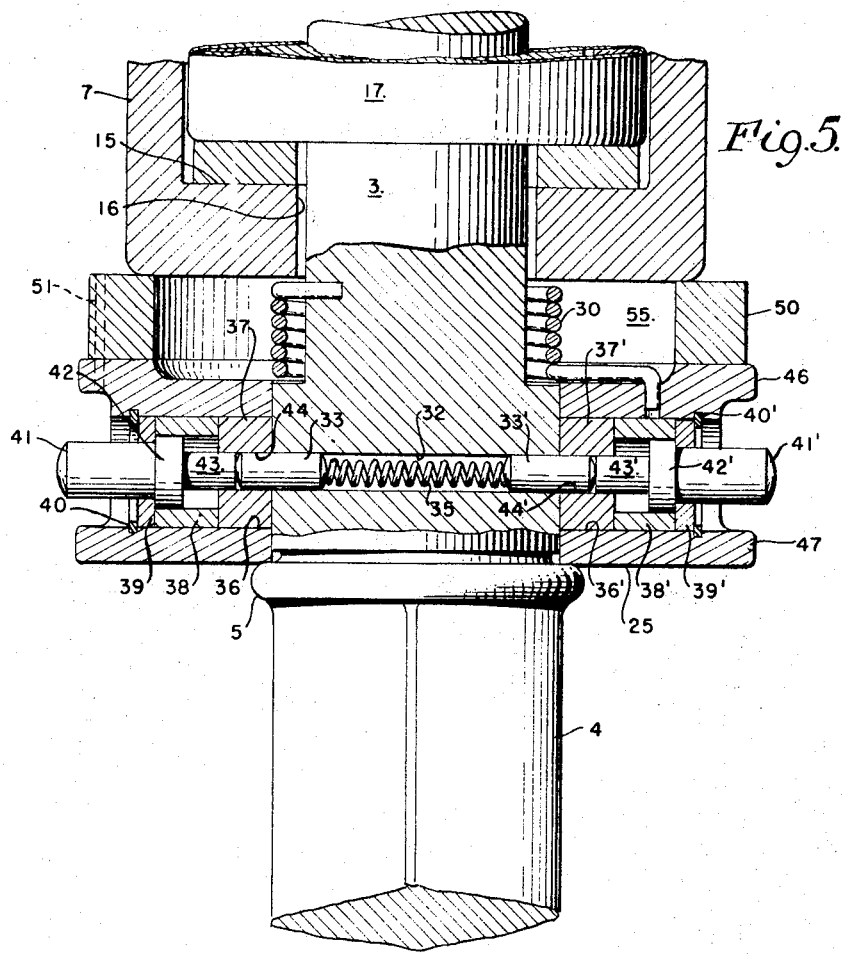
FIG. 5 is a sectional view taken generally along the line 5—5 in FIG. 1.

Referring particularly to FIGS. 1 and 2, it will be seen that the safety hook of the present invention, is designated as 1 and generally includes a hook body 2 having shank end portion 3, a hook end portion 4 and an intermediate radially extending annular bearing portion 5; a gate mechanism, generally indicated at 6; and a hook body supporting sleeve member 7.

In FIG. 1 hook end portion 4 is shown as terminating in a tip portion 8 and as being curved to define a hook mouth, generally indicated at 10.

In FIGS. 1 and 2, shank end portion 3 is shown as terminating in a threaded end portion 11, which is adapted to receive locking means in the form of a slotted nut 12, maintained in position on end portion 11 by a cotter pin 13 received within shank opening 14.

Safety hook 1 may be connected to a suitable suspension mechanism, not shown, by means of supporting sleeve 7, which is provided with a radially inwardly extending annular flange 15, bored, as at 16, to freely receive shank end portion 3.

A conventional ball bearing friction reducing sleeve 17 may be employed to support slotted nut 12 on flange 15, so as to permit free rotation of shank portion 3 within support flange bore opening 16.

Sleeve 7 may be provided with one or more openings 18 to permit attachment thereof to a suspension mechanism, and a pair of aligned enlarged openings 19 to permit access to nut 12 and cotter pin 13 in order to facilitate assembly of the safety hook.

Supporting sleeve 7 is also adapted to cooperate with hook body intermediate bearing portion 5 to position gate mechanism 6 axially of shank portion 3.

In FIGS. 1–3 gate mechanism 6 is shown as including a casting in the form of sleeve or collar portion 25 having an integrally formed arm portion 26. Sleeve portion 25 is rotatably supported by shank portion 3 in end engagement with bearing portion 5, so as to permit arm 26 to be moved from its hook mouth closed position, illustrated in FIGS. 1–4, in the direction indicated by arrow 27 into hook mouth open position in the manner indicated in phantom in FIG. 3. Arm 26 is preferably adapted to extend completely across hook mouth 10, when in its closed position, and is recessed, as at 28, on the free end portion thereof to receive hook tip portion 8.

In the preferred embodiment of safety hook 1, a coil spring 30, whose respective ends are affixed to shank portion 3 and gate sleeve portion 25, as shown particularly in FIGS. 3 and 5, is employed to bias arm 26 into its hook mouth closed position, whereat arm recess 28 engageably receives hook tip portion 8. This arrangement facilitates positioning of arm 26 in its closed position and serves as a safety guard for tip portion 8.

Figure 6:
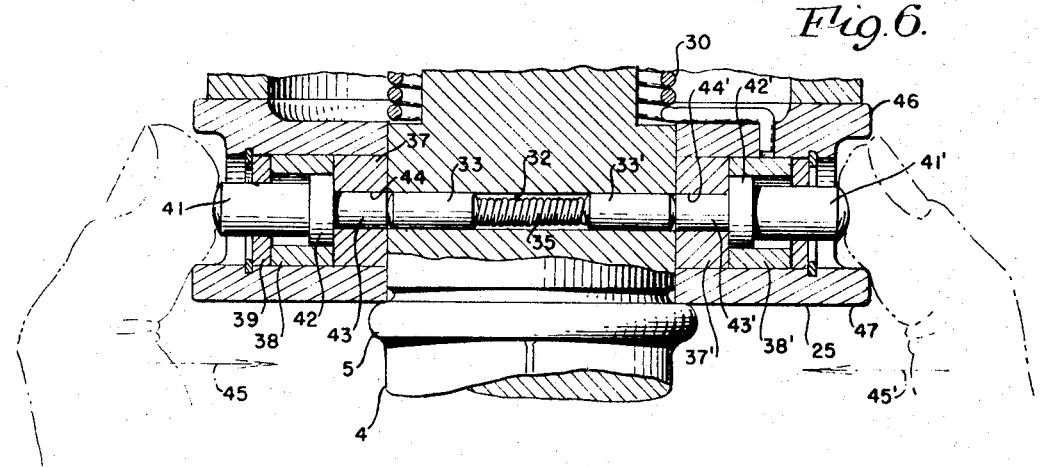
FIG. 6 is a fragmentary view similar to FIG. 5, but showing the retaining pins moved to their gate release positions.

Arm 26 may be releasably locked in hook mouth closed position by the arrangement shown particularly in FIGS. 5 and 6, wherein shank portion 3 is provided with a transversely extending bore opening 32, which is adapted to slidably receive a pair of retaining 33, 33' and a compression spring 35 employed to bias retaining pins 33, 33' outwardly in opposite directions to position the outwardly facing ends thereof in locking engagement with gate sleeve portion 25.

In FIGS. 5 and 6 gate sleeve portion 25 is shown as having a pair of aligned transversely extending bore openings 36, 36', which are adapted to receive axially aligned bushings 37, 37', spacer sleeves 38, 38', washers 39, 39' and retaining rings 40, 40' respectively. Further, in FIGS. 5 and 6 gate sleeve portion 25 is shown as carrying a pair of manually operable release buttons 41, 41' having annular flange enlargements 42, 42' which are slidably supported within spacer sleeves 38, 38', and pin portions 43, 43', which are slidably received within bushing bore openings 44, 44', respectively.

When gate 6 is rotated to place arm 26 in its hook mouth closed position, bushing bore openings 44, 44' are placed in alignment with the respective ends of shank bore opening 32, thereby permitting spring 35 to force the outwardly facing ends of retaining pins 33, 33' into locking engagement within bushing bore openings 44, 44' and into end engagement with release button pin portions 43, 43', respectively. The extent of travel of the outwardly facing ends of retaining pins 33, 33' within bushing bore openings 44, 44' is limited by engagement of release button flange enlargements 42, 42' with washers 39, 39' in order to insure that retaining pins 33, 33' are not forced completely out of shank bore opening 32.

When it is desired to rotate gate 6 to remove arm 26 from gate closed position, an operator may manually depress buttons 41, 41' in order to effect reciprocation thereof in the direction of arrows 45, 45', as illustrated in FIG. 6. When buttons 41, 41' are fully depressed, the flange enlargements 42, 42' are forced into engagement with bushings 37, 37' in order to position the free ends of pins 43, 43' adjacent the interfaces defined by bushings 44, 44' and the cylindrical, outwardly facing bearing surface of shank portion 3, and thereby remove the outwardly facing ends of retaining pins 33, 33' from locking engagement within bore openings 44, 44'. Thereafter, an operator may rotate gate 6 in the direction of arrow 27 in order to open hook mouth 10. It will be apparent that when gate 6 is removed from its closed position, the outwardly facing ends of retaining pins 33, 33' will be restrained from relatively outward movement by engagement with the inwardly facing cylindrical bearing surface of gate sleeve portion 25.

Upon release of gate 6 by an operator, coil spring 30 will automatically return the gate to hook mouth closed position, whereat bushing bore openings 44, 44' are again aligned with the respective ends of shank bore opening 32 to permit locking of the gate in hook mouth closed position in the manner described.

Preferably, gate sleeve portion 25 is provided with a pair of relatively spaced, annular flanges or elevated portions 46, 47, which partially bound release buttons 41, 41' and serve to prevent inadvertent operation thereof upon engagement of gate 6 with a broad surfaced object.

By providing a pair of retaining pins 33, 33' and release buttons 41, 41' there is introduced into the safety hook structure a safety feature, which requires that the release buttons be simultaneously and fully depressed before gate 6 may be rotated from hook mouth closed position.

Again referring particularly to FIG. 5 it will be seen that a spacer ring 50 is suitably affixed to gate sleeve portion 25, as by means of one or more pins 51. Spacer ring 50 and gate sleeve portion 25 cooperate with supporting sleeve flange 15 to define a cavity 55 in which coil spring 30 is disposed and protected from injury, as indicated in both FIGS. 3 and 5.

While there has been described in detail only the preferred embodiment of the safety hook of the present invention, it will be apparent that various additions to and modifications thereof may be made by one skilled in the art in view of the foregoing description. Exemplary thereof would be the utilization of only one retaining pin and accompanying release button or the utilization of a resilient rubber or plastic substitute for the compression spring employed to position the retaining pins. Additionally, rather than being vertically suspended in the manner indicated in the drawings, the safety hook may be inverted and the shank portion thereof affixed to an object to be lifted. Accordingly, it is desired that the scope of protection for the present invention be limited only by the appended claims wherein:

What I claim as my invention is:

1. A safety hook comprising:
    a hook body having a shank end portion and a hook end portion, said hook end portion terminating in a tip portion and being curved to define a hook mouth;
    a gate rotatably supported on said shank end portion for movement between hook mouth opened and closed position;
    and releasable means adapted to normally prevent rotation of said gate away from said hook mouth closed position said releasable means including a pair of retaining pins slidably received within an opening extending transversely of said shank portion, resilient means disposed within said shank opening in engagement with facing end portions of said retaining pins, said resilient means tending to bias outwardly facing ends of said retaining pins outwardly with respect to said shank into engagement with said gate, said gate having a pair of openings adapted to be aligned with opposite ends of said shank opening when said gate is rotated to hook mouth closed position, said gate openings when aligned being adapted to receive said outwardly facing ends of said retaining pins to prevent rotation of said gate with respect to said shank, and said gate includes release buttons adapted to operably engage said outwardly facing end portions of said retaining pins to force said pins from said gate openings.

2. A safety hook acording to claim 1, wherein said gate includes an arm adapted to extend across said hook mouth and having a free end portion thereof recessed to engageably receive said hook tip portion when said gate is rotated into said hook mouth closed position.

3. A safety hook accordingly to claim 1, wherein said hook body portion includes a radially extending bearing portion intermediate said shank and hook end portions, said shank portion terminates in an end portion adapted to receive a locking means, and said safety hook additionally includes a hook body support member having a radially inwardly extending annular flange provided with a bore opening adapted to freely receive said shank portion, and a friction reducing sleeve member adapted to support said locking means on said flange and permit rotation of said shank portion within said support flange bore opening, said flange cooperating with said hook bearing portion to limit movement of said gate axially of said shank portion.

4. A safety hook according to claim 8, wherein said gate includes an arm adapted to extend across said hook mouth and having a free end portion thereof engageable with said hook end tip portion when said gate is rotated into said hook mouth closed position;
    and said safety hook additionally includes a coil spring interconnecting said gate and said hook shank, said spring tending to rotate said gate to position said arm in engagement with said hook tip portion, said flange cooperating with said gate to define a cavity disposed annularly of said shank portion, and said coil spring being positioned within said cavity.

5. A safety hook according to claim 1, wherein said release buttons project radially outwardly from said gate and are adapted to be manually reciprocated towards said shank portion to force said pins from said gate openings, and said gate is provided with elevated portions at least partially bounding said release buttons to prevent operation thereof upon engagement of said gate with a broad surfaced object.

References Cited

UNITED STATES PATENTS 2,728,967   1/1956   Burnham _____ 24—241

RICHARD E. AEGERTER, Primary Examiner

A. N. GOODMAN, Assistant Examiner

U.S. Cl. X.R.

294—78